United States Patent Office 2,857,253
Patented Oct. 21, 1958

---

2,857,253

DIESEL FUEL COMPOSITIONS

James B. Hinkamp, Birmingham, and Roy Sugimoto, Royal Oak, Mich., assignors to Ethyl Corporation, New York, N. Y., a corporation of Delaware No Drawing. Application May 28, 1956
Serial No. 587,473

2 Claims. (Cl. 44—62)

This invention relates to synergistic mixtures and in particular to synergistic distillate diesel fuel blends possessing improved stability and compatibility characteristics.

This application is a continuation-in-part of parent application Serial No. 323,165, filed November 28, 1952, now abandoned.

Alkyl nitrates such as amyl nitrate are used to improve the combustion characteristics of diesel fuel. This improvement is spoken of as increase in cetane number. Use of such alkyl nitrates has been of definite benefit to diesel fuel users, but it has brought on the problem of decreased stability and compatibility of fuels containing such additives.

It is an object of this invention to provide new compositions of matter. A further object is to provide improved diesel fuels. Still another object is to provide diesel fuels of enhanced stability-compatibility characteristics, which fuels contain alkyl nitrate as cetane improver. Other objects will be apparent from the ensuing description of the invention.

The above and other objects are accomplished by providing synergistic compositions which consist of diesel fuel to which is added minor amounts of alkyl nitrate and rosin amine. In a preferred form of this invention we provide diesel fuel to which has been added amyl nitrate and a mixture of dehydroabietylamine, tetrahydroabietylamine, dihydroabietylamine and dextropimarylamine. Such mixtures have been found to synergistically improve the stability and compatibility characteristics of distillate fuels of the diesel type. Most preferably we employ synergistic mixtures comprising diesel fuel containing 0.005 to about 1.0 percent by weight of rosin amine and from 0.05 to about 10 percent by weight of alkyl nitrate. Thus, the ratio of alkyl nitrate to rosin amine in our synergistic mixtures ranges from about 10 to 1 to about 2000 to 1.

The ammonoid derivates of rosin comprising one member of the synergistic mixtures of this invention are ammonoid derivatives of rosin wherein nitrogen is linked by covalent bonds to at least one carbon atom and usually hydrogen atoms as well. Thus, these ammonoid derivatives of rosin can be defined as a material selected from the class consisting of rosin amine and rosin amine derivatives. Rosin amine has been defined as a primary amine reacting as a mild alkali. The term "rosin amine" is used herein to include broadly the primary amines derived from various rosins or rosin acids whereby the carboxyl of the rosin or rosin acid is converted into a —CH$_2$NH$_2$ group. Rosin, or colophony, the resin remaining after distilling turpentine from the exudation of various species of pine, is composed largely of abietic acid and abietic acid anhydride. Rosin amines included within this invention are gum and wood rosin amines, derived respectively from gum and wood rosin and containing chiefly abietylamine; dehydrogenated rosin amine derived from dehydrogenated rosin and containing chiefly dehydroabietylamine; hydrorosin amine derived from hydrogenated gum or wood rosin and containing chiefly dihydro- and tetrahydroabietylamine; heat treated rosin amine derived from heat treated rosin; polymerized rosin amine derived from polymerized rosin; isomerized rosin amine derived from isomerized rosin and containing substantial amounts of abietylamine; and the rosin amines derived from the pure rosin acids, namely, abietylamine, dihydroabietylamine, dehydroabietylamine and tetrahydroabietylamine. The rosin amines may be prepared by reacting ammonia with a natural rosin or a modified rosin to form the nitrile from the carboxyl group in the rosin and then hydrogenating the rosin nitrile or modified rosin nitrile to form the amine. The reactions involved in preparation of the rosin amines may be generally illustrated as follows:

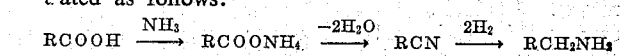

in which R represents a rosin acid nucleus, such as the abeit-, dehydroabiet-, dihydroabiet-, or tetrahydroabiet- radical. Derivatives of rosin amine comprise reaction products formed by the interaction of rosin amine with substances containing acidic functions or with heterocyclic compounds known in the art as epoxides, such as ethylene oxide, propylene oxide, and the like. Thus, rosin amine derivatives include rosin amine acetate, -glycolate, -stearate, -pentachlorophenate, -naphthenate, polyethanol rosin amine, and the like. Ammonoid derivatives of rosin are currently available as articles of commerce.

The rosin amine preferred as the distillate fuel additive of this invention is a mixture of dehydroabietylamine, tetrahydroabietylamine, dihydroabietylamine, and dextropimarylamine having the structural formulae

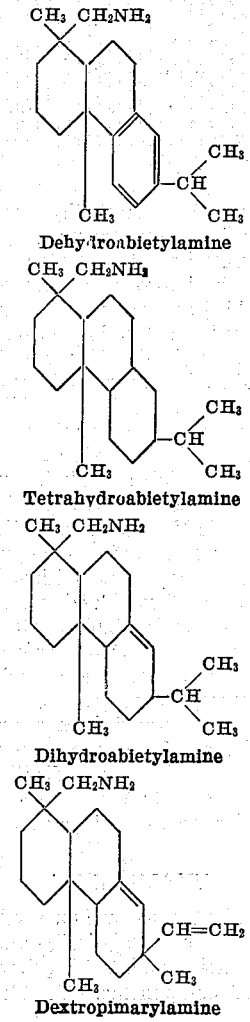

This mixture of rosin amines is commercially available under the trade name "Rosin Amine D."

The alkyl nitrates of our synergistic mixtures include the various straight and branched open chain esters of the character obtained by the interaction of nitric acid with the corresponding straight and branched open chain aliphatic alcohol. It is to be understood that the term "alkyl nitrate" is also generic to mixtures of alkyl nitrates comprising esters of differing numbers of carbon atoms as well as mixtures of isomers of a single ester, but containing varying proportions of the diverse positional isomers. The former is illustrated by a mixture of $C_4$, $C_5$ and $C_6$ alkyl nitrates whereas the latter can be exemplified by a mixture comprising any number of the eight theoretically possible positional isomers of amyl nitrate. As indicated previously, alkyl nitrates both singly and in admixture have been used in the prior art as cetane improvers. Suitable nitrate esters include the nitrate esters derived from methyl, ethyl, propyl, isopropyl, butyl, sec-butyl, isobutyl, tertiary butyl, and other homologous alcohols including the various positional isomers of amyl, heptyl, octyl, nonyl, decyl, and like alcohols or mixtures thereof. Amyl nitrate is preferred because of its outstanding effect in cetane number.

The synergistic mixtures of this invention greatly effect the stability and compatibility of diesel fuel. These are, in fact, two closely related problems in the utilization of distillate fuels including both heating oil and diesel fuel, which have been of considerable concern to petroleum refiners. Compatibility can be defined as that characteristic of distillate fuels which allows them to be mutually blended in all proportions without producing a product having properties less suitable than either constituent alone. Incompatibility, therefore, results in the formation of sludge and other undesirable products. In contrast, stability can be defined as the characteristic of a fuel which allows it to remain unaffected by its environment and unchanged with time. Consequently, instability often results in the formation of "soluble gum" or in the formation of chemical residues commonly termed "insoluble gum," "sludge," "residue," and the like.

We have found that our mixtures synergistically improve the stability and compatibility characteristics of diesel fuel. That is to say, our synergistic mixtures improve these characteristics to an extent which is greater than the sum of the improvements imparted by either ingredient when added separately to the diesel fuel.

The procedure used to determine the stability-compatibility characteristics of distillate fuel blends of the present invention consists, in general, of preparing a blend of fuels posesssing notorious incompatibility characteristics. This was accomplished by mixing together equal volumes of a commercially available straight-run fuel and a commercially available catalytically-cracked fuel. A portion of this blended fuel was stored under a constant temperature of 110° F. whereas additional portions of the fuel were treated with minor proportions of rosin amine prior to storage under identical conditions. Periodically, samples of these blends were removed and the sediment and other insoluble matter was filtered through tared filter papers and the residue was washed with hexane and weighed. Whenever sufficient sediment adhering to the storage containers was noted, it was carefully removed and treated in a manner analogous to the filtered sediment. To demonstrate these stability-compatibility characteristics of the distillate fuel blends of the present invention reference is made to the following specific examples, wherein all parts and percentages are by weight.

EXAMPLE I

A fuel composed of equal volumes of commercially available straight-run and catalytically-cracked fuels was prepared by intimately mixing 15 gallons of each of the aforementioned components. To 615 parts of this untreated fuel was added 0.12 parts of rosin amine made up of a mixture of dehydroabietylamine, tetrahydroabietylamine, dihydroabietylamine and dextropimarylamine and the resulting blend was intimately mixed producing a homogeneous fuel composition containing 0.02 percent of rosin amine. Likewise, to 615 parts of the original fuel blend was added 0.31 parts of rosin amine and a homogeneous fuel composition containing 0.05 percent was produced by agitating the aforementioned components. The treated and untreated samples were then stored at a constant temperature of 110° F. for a period of one month. The samples were then allowed to stand at room temperature for two additional months after which time the samples were filtered through tared filter papers. The residue was washed with hexane and weighed. Since there was essentially no sediment adhering to the containers, no correction for this was necessary. It was found that the clear fuel contained 46.1 milligrams of sediment per liter whereas the fuel containing 0.02 percent of rosin amine contained 21.4 milligrams of sediment per liter. The fuel containing 0.05 percent of rosin amine contained 4.7 milligrams of sediment per liter. Thus, the fuel containing 0.02 percent of rosin amine contained 53.6 percent less sediment than the corresponding untreated fuel. Likewise, the fuel containing 0.05 percent of rosin amine contained 89.8 percent less sediment than the untreated fuel. The treated fuels above were satisfactory for use as burner and diesel fuels by virtue of the decreased amounts of sediment.

EXAMPLE II

The fuels described in Example I were stored for three months at a constant temperature of 110° F. At the end of this time samples were removed and treated as described in the preceding example. In addition, the sediment adhering to the containers was removed and treated in the same fashion as the filterable solids. The data are presented in Table I.

*Table I*

| Additive | Conc., Wt. Percent | Sediment, mg./l | Adhering Sediment, mg./l. | Total Sediment, mg./l. |
|---|---|---|---|---|
|  |  | 53.6 | 28.8 | 82.4 |
| rosin amine | 0.02 | 30.6 | 28.2 | 58.8 |
| rosin amine | 0.05 | 3.0 | 39.2 | 42.2 |

Thus, two of the fuels, to-wit: those containing 0.02 and 0.05 percent of rosin amine contained respectively 28.6 percent and 48.8 percent less total sediment than the corresponding untreated fuel.

EXAMPLE III

An additional series of samples prepared in accordance with the procedure of Example I was removed from storage at 110° F. for a period of five months. The technique for determining the amount of sediment consisted essentially of drying filter papers in an oven at 110° C. and subsequently allowing these papers to reach equilibrium under conditions of constant temperature and humidity before weighing them. The same procedure was repeated after filtering the sediment from the samples. It was found that the untreated fuel contained 69.3 milligrams of sediment per liter whereas the fuels treated with 0.02 and 0.05 percent of rosin amine contained respectively 32.1 and 18.0 milligrams of sediment per liter. Therefore, the fuels treated with rosin amine contained respectively 53.7 and 74.0 percent less sediment than an untreated fuel.

The preceding illustrative examples have demonstrated the improved stability-compatibility characteristics of representative fuels treated with rosin amine, one of the ingredients of our synergistic mixtures. To demonstrate the stability and compatibility properties possessed by fuels containing the synergistic mixtures of the instant invention, namely, distillate fuel containing minor proportions of alkyl nitrate and rosin amine, reference is made to the following examples wherein all parts and percentages are by weight.

EXAMPLE IV

To 615 parts of the fuel composition described in Example I was added 1.85 parts of amyl nitrate and 0.12 parts of rosin amine. The aforementioned components were intimately mixed producing a homogeneous fuel composition containing 0.3 percent of amyl nitrate and 0.02 percent of rosin amine. Likewise, another of the fuel compositions of the present invention, that is, a fuel containing 0.3 percent of amyl nitrate and 0.05 percent of rosin amine was prepared by adding to 615 parts of the untreated fuel described in Example I, 1.85 parts of amyl nitrate and 0.31 parts of rosin amine and agitating the resulting mixture. These fuel compositions were stored together with a fuel containing 0.3 percent of amyl nitrate at a constant temperature of 110° F. for one month. At the end of this time the fuels were removed and allowed to stand for two additional months at room temperature. The procedure as described in Example I was then repeated and it was found that the fuel containing 0.03 percent of amyl nitrate contained 86.7 milligrams of sediment per liter whereas the fuel containing 0.3 percent of amyl nitrate and 0.02 percent of rosin amine contained 19.9 milligrams per liter of sediment. The fuel containing 0.3 percent of amyl nitrate and 0.05 percent of rosin amine was found to contain 8.3 milligrams of sediment per liter. Consequently, two of the fuels of the present invention, namely, those containing an alkyl nitrate and 0.02 and 0.05 percent of rosin amine contained respectively 77.0 percent and 90.4 percent less sediment than the corresponding fuel not treated in accordance with the present invention.

EXAMPLE V

The procedure as described in Exampe IV was repeated with but one variable, that is, the fuels were allowed to stand at a temperature of 110° F. for a period of three months prior to determining the amounts of filterable sediment and sediment adhering to the storage containers. The data are presented in Table II. All samples contained 0.3 percent of amyl nitrate.

Table II

| Additive | Conc., Wt. Percent | Sediment, mg./l. | Adhering Sediment, mg./l. | Total Sediment, mg./l. |
|---|---|---|---|---|
|  |  | 67.3 | 38.7 | 106.0 |
| rosin amine | 0.02 | 27.9 | 55.6 | 83.5 |
| rosin amine | 0.05 | 7.6 | 47.2 | 54.8 |

Thus, the fuels of the present invention containing minor proportions of an alkyl nitrate and 0.02 and 0.05 percent of rosin amine contained respectively 21.2 percent and 48.3 percent less total sediment than an untreated fuel composition.

EXAMPLE VI

The fuel compositions described in Example IV were stored at 110° F. for five months. The amount of sediment formed during this period was determined by drying filter papers in an oven at 110° C. and allowing these papers to come to equilibrium under conditions of constant temperature and humidity before obtaining their weights. After the filtrations, the same procedure was repeated. It was found that the fuel containing only the amyl nitrate in an amount of 0.3 percent contained 94.5 milligrams of sediment per liter. In contrast, the fuel containing both 0.3 percent of amyl nitrate and 0.2 percent of rosin amine contained 51.5 milligrams of sediment per liter. The fuel containing 0.3 percent of amyl nitrate and 0.5 percent of rosin amine contained 32.2 milligrams of sediment per liter. Thus, the fuels treated in accordance with the present invention contained respectively 45.5 percent and 65.9 percent less sediment than the untreated fuel.

It will be seen from the above examples that the mixtures of additives employed in this invention possess a definite synergism. For example, it is noted from Example IV that diesel fuel to which 0.3 percent amyl nitrate was added, after standing at 110° F. for one month followed by standing at room temperature for two months was found to have a deposit accumulation amounting to 86.7 mg./l. whereas the same fuel treated in the same way without the amyl nitrate present (Example I) had a deposit accumulation of 46.1 mg./l. It is clear that amyl nitrate although enhancing the cetane number of the fuel definitely impairs the stability. It is noted for Example I that the same fuel containing 0.2 percent rosin amine and no amyl nitrate when stored under the same conditions had an accumulated deposit of 21.4 mg./l. Thus, the rosin amine definitely improved the stability of the fuel. However, it is further noted from Example IV in which the same fuel containing 0.3 percent amyl nitrate and 0.02 percent rosin amine when stored under the same conditions for the same length of time gave an accumulated deposit weight of only 19.9 mg./l. Thus, it is seen that a synergistic mixture of an alkyl nitrate of this invention and a rosin amine of the invention not only overcomes the unstabilizing effect of amyl nitrate but actually converts this to a stabilizing effect and in fact this stabilizing effect is even greater than that achieved by use of rosin amine alone.

The same type of synergism is effected by each and every synergistic mixture of this invention. To give another illustration, Example III shows that a diesel fuel when stored at 110° F. for five months gave a deposit accumulation of 69.3 mg./l. The same fuel when stored with 0.3 percent amyl nitrate for the same time under the same conditions gave a deposit accumulation of 94.5 mg./l. Again the amyl nitrate decreased the stability of the fuel. The same fuel when stored with 0.05 percent rosin amine under identical conditions gave a deposit accumulation of 18.0 mg./l. The combined effect of the two additives if no synergism were present would be a stabilization of 51.3 mg./l. contributed by the rosin amine (69.3 m./l. for the clear fuel minus 18.0 mg./l. for the amine-containing fuel) and 25.2 mg./l. contributed by the amyl nitrate (69.3 mg./l. for the clear fuel minus 94.5 mg./l. for the fuel containing the nitrate). The same sum of the two stabilizing effects if additive would be 26.1 mg./l. (the sum of the stabilization of 51.3 mg./l. contributed by the rosin amine and the negative stabilization of 25.2 mg./l. contributed by the alkyl nitrate). The actual stabilization as shown in Example VI is 37.1 mg./l. (69.3 mg./l. for the clear fuel minus 32.2 mg./l. for the fuel containing the synergistic mixture). Thus, the effect of the synergistic mixture is again more than the sum of the effects of the two separate components.

Similar synergistic action is demonstrated by the other mixtures of this invention.

The proportions of the ingredients of our synergistic mixture depend upon the character of the fuel and the nature of the ammonoid derivative of rosin employed. The amount of alkyl nitrate to be added is contingent upon the nature of the alkyl nitrate employed and the desired improvement in cetane value to be obtained. However, in general, the amount of rosin amine or its derivatives can be in the order of about 0.005 to about 1.0 percent by weight. In some cases benefits are to be derived by utilizing substantially greater amounts of rosin amine or its derivatives. The amount of alkyl nitrate employed can, in general, be in the order of about 0.05 percent to about 10 percent by weight.

Many variations within the spirit and scope of the present invention will become apparent to those skilled in the art. We wish, particularly, to indicate that we can prepare fluids, that is, compositions for use in diesel fuels comprising an alkyl nitrate or a mixture of alkyl nitrates and an ammonoid derivative of rosin wherein the proportions of the aforesaid ingredients are adjusted such that when blended in fuels for compression ignition engines amounts of the components within the ranges previously specified are obtained. Thus, we can provide a composition for use in distillate fuel comprising 10 parts by weight of alkyl nitrate to 1 part by weight of an ammonoid derivative of rosin. An illustrative example of such a composition can be prepared by combining 1000 pounds of amyl nitrate with 100 pounds of rosin amine and shaking, stirring or otherwise agitating the resulting mixture to produce a homogeneous diesel fluid of our invention. An improved distillate fuel composition of the present invention can be provided by blending 11 parts of the fluid with 10,000 parts of distillate fuel. Similarly, by blending 22 parts of the aforementioned fluid with 10,000 parts of distillate fuel we can provide an additional improved fuel composition of this invention. Likewise, we can provide other diesel fluids of this invention comprising up to about 2000 parts by weight of alkyl nitrate to 1 part by weight of ammonoid derivative of rosin. For example, we can combine and intimately mix 2000 or 2500 pounds of isooctyl nitrate with 100 pounds of rosin amine to prepare other unique and important fluids of our invention. In accordance with the preceding, we can prepare compositions for use in distillate fuel such as, for example, compositions comprising butyl nitrate and rosin amine, amyl nitrate and rosin amine naphthenate, amyl nitrate and rosin amine stearate, butyl nitrate and polyethanol rosin amine, heptyl nitrate and rosin amine acetate, octyl nitrate and rosin amine pentachlorophenate, decyl nitrate and rosin amine glycolate and the like.

As indicated hereinbefore, we can prepare stable distillate fuels comprising cracked stocks containing minor proportions of an alkyl nitrate and a material selected from the group consisting of rosin amine and derivatives. In certain cases, it will be advantageous to blend the rosin amine or its derivatives with the catalytically-cracked streams as they are produced from the cracking operations. In some instances, it is efficacious to blend the rosin amine or its derivatives with such cracked stocks intended for blending purposes prior to blending such improved fuel with straight-run gas oil. A variation of this within the contemplation of this invention is to blend the rosin amine or its derivatives with the straight-run gas oil prior to blending the resulting composition with cracked stocks. Likewise, the rosin amine or its derivatives can be added during the blending of cracked and straight-run fuels or subsequent to such blending operations. Blending of the alkyl nitrate is done in accord with similar considerations.

The rosin amine or its derivatives can be added prior to, concurrent with, or subsequent to the addition of the alkyl nitrate. Other variations include mixing the rosin amine or its derivatives with the cracked stock and the alkyl nitrate with the straight-run distillate fuel prior to blending operations or adding a composition comprising alkyl nitrate and a material selected from the class consisting of rosin amine and rosin amine derivatives to the catalytically cracked stocks prior to, concurrent with, or subsequent to blending operations.

Having fully described the nature of the instant invention, the need therefor, and the best methods devised for carrying it out, we do not intend that our invention be limited except within the spirit and scope of the appended claims.

We claim:

1. As a new composition of matter a diesel fuel consisting essentially of a hydrocarbon mixture boiling in the diesel fuel range and containing a synergistic mixture which consists of a lower alkyl nitrate and rosin amine wherein the rosin amine consists essentially of dehydroabietylamine having the structural formula

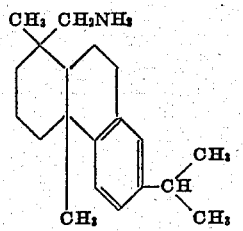

tetrahydroabietylamine having the structural formula

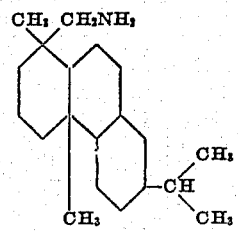

dihydroabietylamine having the structural formula

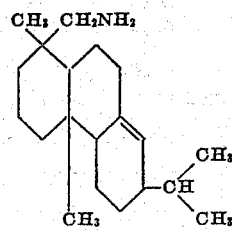

and dextropimarylamine having the structural formula

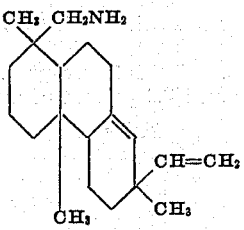

the total amount of said lower alkyl nitrate being from 0.05 to 10 percent by weight of the fuel and the total amount of said rosin amine being 0.005 to 1.0 percent by weight of the fuel.

2. The composition of claim 1 wherein said lower alkyl nitrate is amyl nitrate.

References Cited in the file of this patent

UNITED STATES PATENTS

| | | |
|---|---|---|
| 2,456,569 | Smith | Dec. 14, 1948 |
| 2,484,010 | Bried | Oct. 11, 1949 |
| 2,684,292 | Caron et al. | July 20, 1954 |
| 2,692,821 | Ambrose et al. | Oct. 26, 1954 |

OTHER REFERENCES

Soap and Sanitary Chemicals, December 1947, pages 147, 149, and 167.